May 26, 1942.                J. H. SISSEL                 2,284,595
                       ENGINE TRANSMISSION DEVICE
                        Filed Sept. 25, 1940           2 Sheets-Sheet 2
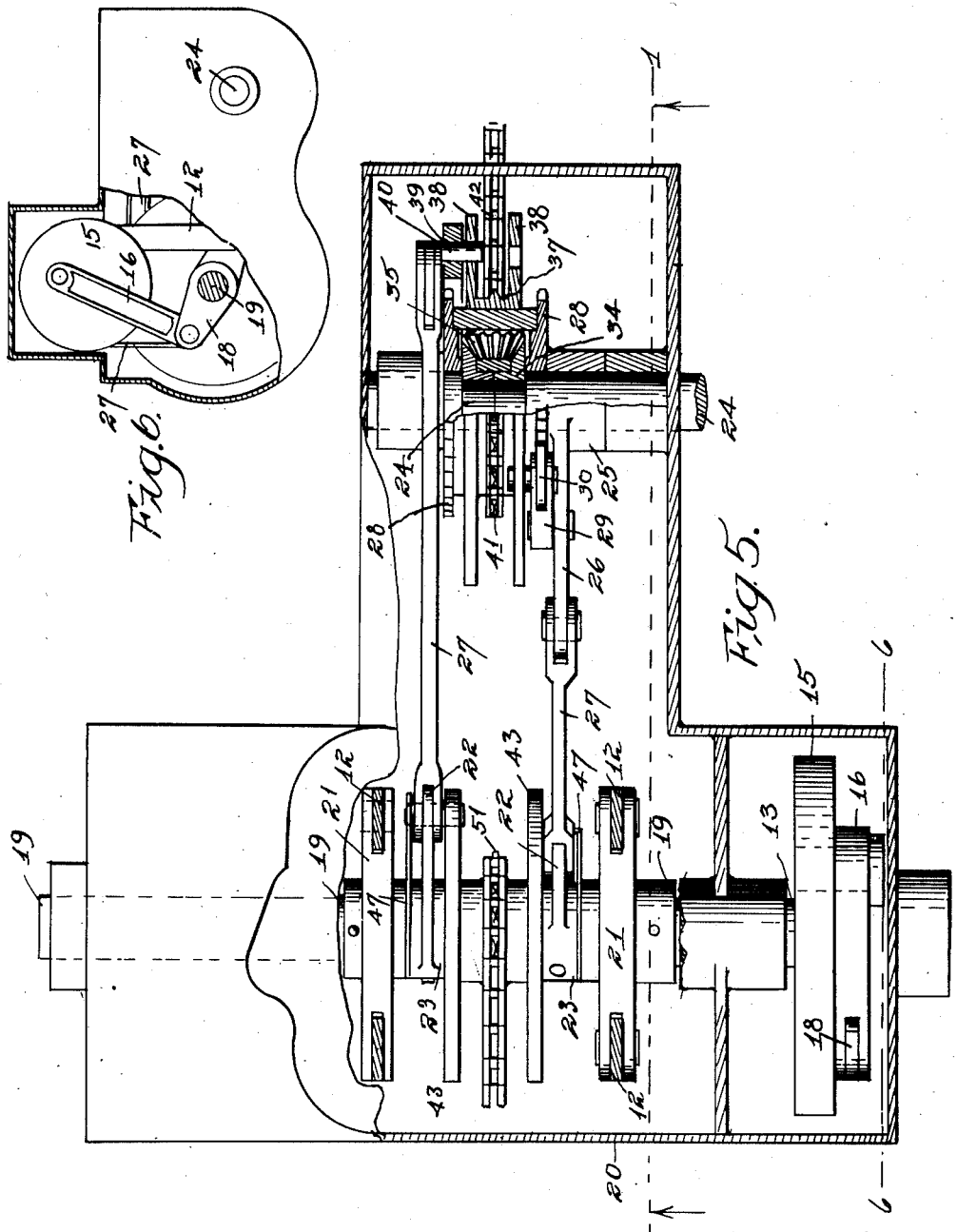
Inventor
John H. Sissel Patented May 26, 1942

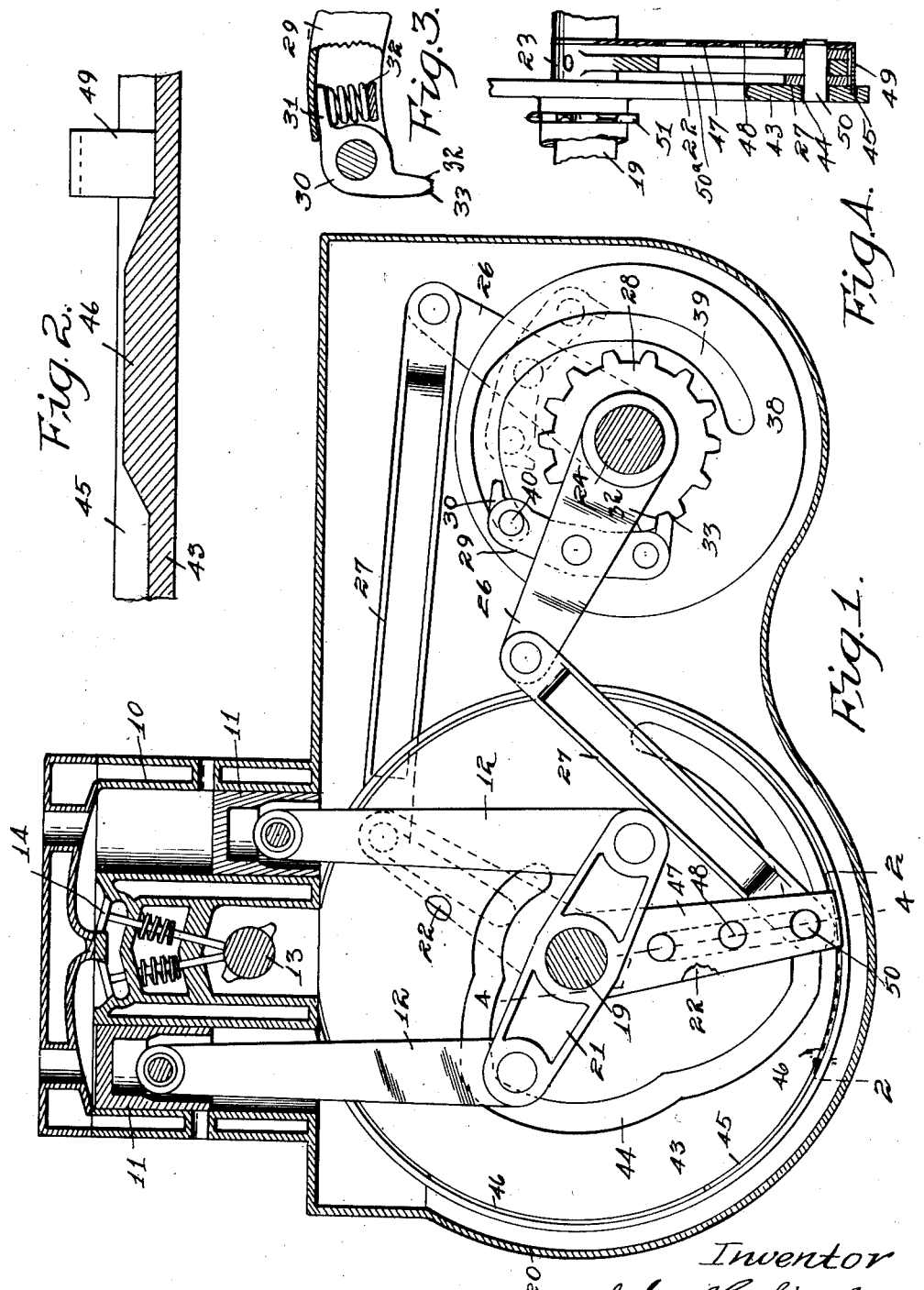

2,284,595

UNITED STATES PATENT OFFICE 2,284,595

ENGINE TRANSMISSION DEVICE

John H. Sissel, Rock Island, Ill.

Application September 25, 1940, Serial No. 358,232

4 Claims. (Cl. 74—117)

In the present automobiles, power from each piston is transmitted to the driven axle by means of an engine shaft having a crank for each piston rod, and power is transmitted to the driven shaft through the differential having beveled gears. In such construction, and when an engine crank shaft is in position substantially at right angles to its piston rod, a maximum amount of power is transmitted to the engine shaft, but when the crank is substantially parallel with the piston rod or near parallel position, a much less amount of power is then applied to the engine shaft. With said construction the power is not applied uniformly and a considerable portion of the avialable power is lost or not utilized efficiently. Furthermore, in transmitting power from the engine shaft to the driven shaft a considerable amount of such power is lost through friction.

The object of my invention is to provide a power transmission mechanism of simple, durable and inexpensive construction, in which the piston rods are at all times substantially at or near position at right angles to the cranks of the engine shaft so that the power applied by the pistons to the engine shaft is substantially uniform throughout the entire piston stroke, thereby utilizing substantially all of the power applied to the piston and avoiding loss of such power at certain periods of the piston strike.

A further object is to provide simple, durable and inexpensive means for transmitting power from the engine shaft to the driven shaft with a minimum of friction, thereby avoiding loss of power on account of such friction.

A further object is to provide simple, durable and inexpensive mechanism for shifting my improved driving mechanism for operating the driven shaft at various speeds of rotation relative to the engine shaft, and for manually operating same readily, easily and quickly.

A further object is to provide simple, durable and inexpensive means easily controlled by the operator for reversing the movement of the driven shaft of my improved driving mechanism.

In the accompanying drawings—

Figure 1 shows a vertical central sectional view of a part of an internal combustion engine and my improved power transmission device applied to a driven shaft, taken on the line 1—1 of Figure 5;

Figure 2 shows an enlarged detail sectional view on the line 2—2 of Figure 1, showing the means for automatically releasing the locking pin for gear-shifting purposes;

Figure 3 shows an enlarged detail sectional view of one of the pawl devices for driving the driven shaft;

Figure 4 shows a sectional view of one of the cranks on the engine shaft, taken on the line 4—4 of Figure 1;

Figure 5 shows a horizontal sectional view with parts broken away to show structural details; and Figure 6 shows a side elevation of my improved power transmission device, partly in section, on the line 6—6 of Figure 5.

As shown in Fig. 1, the view is taken through two side by side engine cylinders 10 having pistons 11 and piston rods 12. Any desired multiple of these pairs of cylinders may be used.

The valve-operating shaft 13 is provided with the usual cylinder valves 14. On the valve shaft 13 is a fly wheel 15 to be constantly rotated in one direction by a pitman 16 driven from the engine shaft 19 by a crank 18.

Below the valve shaft 13 is the main engine shaft 19 mounted in suitable bearings in the casing 20 for rocking movement.

Fixed to the engine shaft 19 below each pair of engine cylinders is a walking beam 21 having a pitman rod 12 pivoted to each of its ends. This walking beam is mounted on the engine shaft in position substantially horizontal when both pistons are in the same horizontal plane at approximately the centers of their strokes. In Fig. 1 one of these pistons is at the top of the stroke and the other at the bottom, but the walking beam is only at a slight angle relative to the horizontal, thereby illustrating that in all of the positions of the walking beam the piston rods are at or near positions at right angles to the longitudinal axis of the walking beam.

For transmitting power from the rocking main engine shaft to the driven shaft, I have provided the following: Mounted on to the engine shaft 19 are two cranks 22. One of them extends downwardly and to the right, as shown in Fig. 1, and the other, shown by dotted lines, upwardly and to the right. These cranks are fixed to sleeves 23 which in turn are fixed to the shaft.

The driven shaft is indicated by the numeral 24 and is rotatably mounted in the casing. Rotatably mounted on the driven shaft are two sleeves 25 each of which has a crank 26 fixed to it.

Pivoted to each of the cranks 26 is a pitman 27 having its other end pivoted to one of the cranks 22. The angularity of the cranks 22 and 26 relative to each other and the connecting pitman is such that each pitman is at or near right angles to its crank during its entire movement.

Fixed to the driven shaft 24 are two ratchet wheels 28 spaced apart. For driving these ratchet wheels there is pivoted to each of the cranks 26 a pawl-carrying bar 29 having at each end a pivoted pawl 30, having an arm 31 engaged by a spring for yieldingly holding it in operative position and permitting it to ride over a ratchet during its inoperative stroke. Each pawl is formed with a relatively straight edge 32 and a beveled edge 33, so that during its operative stroke the straight edge will engage a corresponding straight side of a ratchet tooth, and when being moved away from the ratchet wheel, said beveled edge will avoid rubbing against an adjacent ratchet tooth.

When the pawl on one end of the pawl bar is held in position against the ratchet wheel and the crank 26 is reciprocated, the driven shaft will be rotated thereby a part of a revolution for each pawl stroke.

I have provided means for reversing the direction of rotation of the driven shaft as follows: When the pawl-carrying bar is moved to position for holding the other pawl against the ratchet wheel, then rotary movement of the driven shaft will be reversed, and for shifting the ratchet bars I have provided the following: Rotatably mounted on the shaft 24 is a hub 37 having two discs 38 fixed to it and extended outwardly therefrom, and each disc is formed with a cam slot 39. At one end of each of the ratchet bars 39 is a pin 40 entering the cam slot 39 of the adjacent disc. When this hub 37 is in one position, the pawl at one end of the ratchet bar engages its ratchet wheel, and when the ratchet bar is shifted, the pawl on its other end engages the ratchet wheel, and a movement of the hub 37 causes such movement of the cam discs 38 as to reverse the ratchet bars.

For manually effecting this reversal of the driven shaft I have applied a sprocket wheel 41 to the hub 37, and a sprocket chain 42 is mounted thereon and extended to position for convenient manual manipulation.

For the purpose of permitting the end portions of the shaft to rotate at different speeds I have provided the usual differential gear consisting of a beveled pinion 34 fixed to each part of the engine shaft, and a beveled pinion 35 in mesh with both pinions 34.

For the purpose of shifting speed to high, intermediate or low I have provided the following: Rotatably mounted on the engine shaft 19 adjacent each of the cranks 22 is a disc 43 having a cam slot 44. Near the periphery of the disc is a groove 45 having cams 46, as shown in Fig. 2. Fixed to the crank 22 is a spring arm 47 arranged parallel with the crank 22 and having a series of openings 48. The outer end of the arm 46 is bent at right angles at 49, and is inserted in the groove 45. A pin 50 is slidingly mounted in a groove 50a in the crank 22 and inserted into the cam slot 44. A sprocket wheel 51 is fixed to the hub of the disc 43 to receive a sprocket chain for rotating the disc.

The operation of this gear shift is as follows: In normal operation the disc 43, the crank 22 and the spring arm 47 all move in unison. When it is desired to shift gears the operator moves the sprocket wheel 51. This causes the end 49 of the spring arm 47 to engage the adjacent cam 46 in the groove 45, thereby bending the arm 47 away from the pin 50 so that the pin is free to move longitudinally of the crank 22 and the amount of such movement is governed by the cam slot 44. When the end of the spring arm passes beyond the cam 46 it will spring back to position for receiving the pin 50 in another one of the openings 48.

In practice, the power applied to the piston rods is delivered to the walking beam along lines at or near right angles during the entire stroke of the piston rods, hence, the power is delivered uniformly and without substantial loss. The rocking movement of the engine shaft is applied to the driven shaft as a rotary motion by means of the ratchet wheel and pawls, and the arms 27 are at or near positions at right angles to the cranks 26 at all positions of their movement, hence, a maximum of power is thereby transmitted.

For gear shifting purposes the sprocket wheel 51 is manually moved to the desired position, and the pin 50 is moved toward or from the engine shaft by the cam groove 49 and locked in position, thus increasing or diminishing the length of the stroke of the pawl 30, and for reversing the driven shaft the operator manually moves the sprocket wheel 51, thereby reversing the ratchet bars and thereby reversing the driven shaft.

I have illustrated and described my invention as applied to a single pair of cylinders. When it is desired to construct a four cylinder engine, all of the parts are duplicated and operate in the manner described. However, it is desirable that the cranks 26 for one pair of cylinders be set at different angles from the similar cranks for the other pair of cylinders, thereby applying the power to the driven shaft 24 uniformly.

I claim as my invention:

1. A power transmission apparatus, comprising a rock shaft, a driven shaft, means for transmitting the rocking motion of the engine shaft into continuous rotary motion applied to the driven shaft, comprising two ratchet wheels fixed to the driven shaft, two crank arms pivotally mounted on the driven shaft, a spring actuated pawl carried by each crank arm and engaging the adjacent ratchet wheel, two cranks fixed to the rock shaft, connecting rods pivoted to said cranks, and means for manually moving the connecting rods toward or from the engine shaft for gear shift purposes, comprising a disc rotatably mounted on the engine shaft and formed with a cam slot and also having a circular groove on one face and cams in said groove, a spring arm adjacent each crank arm on the engine shaft and having a series of openings therein and having one end extended into said circular groove, a pin carried by and movable longitudinally in the crank arm and having one end in said cam slot and its other end in one of the openings in the spring arm, the cams in said groove being shaped to spring the arms away from the pin and to permit the spring arm to return and enter another opening in the spring arm.

2. A power transmitting apparatus, comprising a rock shaft, a drive shaft, a crank arm fixed to the rock shaft, means for transmitting power from the crank arm to the driven shaft, comprising a pitman, a ratchet device carried by the pitman and the driven shaft, and means for operatively connecting the pitman and the crank arm and for adjusting it toward and from the rock shaft, comprising a rotatable disc formed with a cam slot having a series of segments at different distances from the rock shaft, a pin adjustably mounted in the crank arm for movement longitudinally of the crank arm, and means for holding the pin in position relative to the crank arm when the pin is in any of said segments of the cam slot.

3. A power transmitting apparatus, comprising a rock shaft, a drive shaft, a crank arm fixed to the rock shaft, means for transmitting power from the crank arm to the driven shaft, comprising a pitman, a ratchet device carried by the pitman and the driven shaft, and means for operatively connecting the pitman and the crank arm and for adjusting it toward and from the rock shaft, comprising a rotatable disc formed with a cam slot having a series of segments at different distances from the rock shaft, a pin adjustably mounted in the crank arm for movement longitudinally of the crank arm, and means for holding the pin in position relative to the crank arm when the pin is in any of said segments of the cam slot, said means comprising a spring arm having a series of openings to receive said pin, and yieldingly movable toward and from the crank arm, and said disc being formed with a cam for engaging and moving the spring arm away from the pin when the disc is rotated, and for permitting it to return to its pin-engaging position.

4. In a power transmitting apparatus, the combination of a rock shaft, a driven shaft, a crank arm driven by the rock shaft, a pitman connected to the crank arm, a crank arm for the driven shaft, a pawl-carrying bar pivoted to the crank arm of the driven shaft, a spring-actuated pawl at each end thereof, a ratchet wheel fixed to the driven shaft to be engaged by said pawls, and means for adjusting the pawl-carrying bar to positions for causing either pawl to engage the ratchet wheel for reversing the movement of the driven shaft, said means comprising a manually adjustable disc having a cam groove, a pin carried by the pawl-carrying bar inserted in said groove, the cam groove being so shaped that when in one position it will hold the pawl-carrying bar in position with one end adjacent the ratchet wheel, and when in another position it will hold the pawl-carrying bar in position with its other end adjacent the ratchet wheel.

JOHN H. SISSEL.